United States Patent [19]

Gudmundsson

[11] Patent Number: 5,741,978
[45] Date of Patent: Apr. 21, 1998

[54] METHOD FOR DETERMINATION OF FLOW RATE IN A FLUID

[76] Inventor: Jon Steinar Gudmundsson, Alfheimsvingen 4, N-7022 Trondheim, Norway

[21] Appl. No.: 817,829
[22] PCT Filed: Nov. 9, 1995
[86] PCT No.: PCT/NO95/00211
 § 371 Date: Jul. 8, 1997
 § 102(e) Date: Jul. 8, 1997
[87] PCT Pub. No.: WO96/15427
 PCT Pub. Date: May 23, 1996

[30] Foreign Application Priority Data

Nov. 9, 1994 [NO] Norway ................. 944264

[51] Int. Cl.⁶ .................................. G01F 1/74
[52] U.S. Cl. ..................................... 73/861.04
[58] Field of Search .................... 73/861.04, 195

[56] References Cited

U.S. PATENT DOCUMENTS 3,523,454  8/1970  Rusnak ............................. 73/205
4,312,234  1/1982  Rhodes et al. ................. 73/861.04
4,364,413  12/1982  Bersin et al. ................... 137/624.2
5,099,697  3/1992  Agar ................................ 73/861.04

Primary Examiner—George M. Dombroske
Assistant Examiner—Jewel V. Thompson
Attorney, Agent, or Firm—Dennison, Meserole, Pollack & Scheiner

[57] ABSTRACT

A method for measuring the flow rate in a fluid flow, particularly a two-phase flow comprising oil, water and gas from an offshore well, in which a temporary transitory shut-off of the fluid flow by means of a valve is performed, and the fluid pressure at a location immediately upstream of the valve is recorded from a moment of time when the valve starts closing to a selected moment of time after the valve is fully closed. Subsequently, the valve is opened to reestablish the fluid flow, and the fluid mass flux G is determined as a function of fluid density, friction factor, pipe diameter, selected moment of time after closure of the valve, friction loss recorded at the selected moment after closure and a pressure surge pressure.

4 Claims, 3 Drawing Sheets

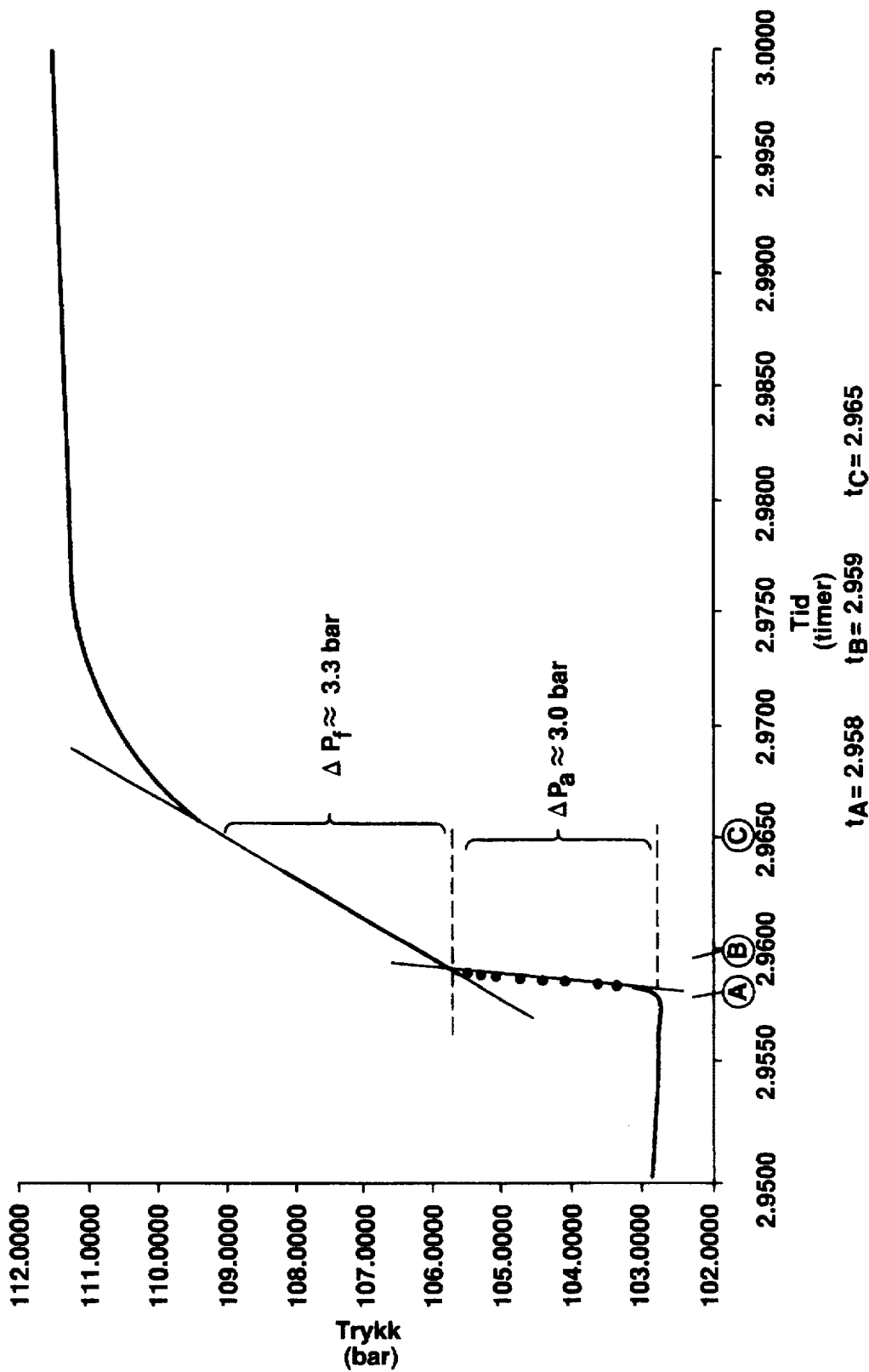

METHOD FOR DETERMINATION OF FLOW RATE IN A FLUID

The present invention concerns a method for determining the flow rate in a fluid flow, particularly in a two-phase flow comprising oil/water/gas from a production well offshore.

BACKGROUND

Measuring of multi-phase flows in oil wells and pipelines including other different flow systems is a serious unsolved problem within the petroleum industry. A complete measurement of a multi-phase flow in e.g. an oil well comprises the three phases gas, oil and water.

In measurements of gas/liquid one has to determine the means flow rate of the composition and the mean density. The total flow rate can then be determined.

In general, it is more convenient to determine the composition density than its flow velocity by means of the known measuring methods for gas/liquid. According to these methods, the density is usually obtained by means of a gamma ray meter. Methods which are under development for measuring multi-phase and gas/liquid employ metering of the water fraction substantially based upon dielectric properties of the hydrocarbon/water composition.

In a multiphase hydrocarbon/water composition, when the multi-phase total density has been obtained by means of a gamma ray meter and the water fraction, the oil fraction and water fraction can be estimated. The apparatus for metering of water fraction usually has a simple and robust construction, and can therefore be implemented on production platforms offshore and possibly in installation below sea level.

However, gamma ray meters are expensive and can not be modified at a low cost to enable them to be used reliably in the harsh conditions existing on production platforms offshore and installations below sea level for commercial metering of well head fluids or fluids in pipelines. Moreover, the radioactive gamma ray source requires strict security regulations.

Capacitance methods are being developed to detect the quantities of hydrocarbons and water flowing in a pipe. This method is however sensitive to water; e.g., the method measures the quantity of waterflowing, whereby the remaining flow is constituted by hydrocarbons. However, this method cannot differentiate between liquid hydrocarbons and gaseous hydrocarbons. The capacitance method is also influenced by the gas/liquid ratio, which calls for a correction of the measuring results in view of an independent measuring result for a gas/liquid fraction, provided from e.g., a gamma ray meter.

Techniques using microwaves are being developed. Microwaves are absorbed by water, and as with the capacitance meter the remainder of the medium is assumed to be hydrocarbons. The microwave technique (and the capacitance method) are also influenced by the gas/liquid ratio. Therefore, calibration is required. On the other hand it is possible to use the microwave technique in cross-correlation, but because of the large volume of the measuring technique, only special features of the multi-phase flow in a large scale are detectable.

While the capacitance method and the microwave technique do in general have the same field of use they also have the same limitations.

In connection with research activity and with commercial activity development is proceeding on metering equipment consisting of two meters: a gamma ray meter and a capacitance or a microwave meter, in which one provides the gas/liquid ratio, and the other the water quantity. However, methods of this type are limited to narrow gas/liquid fractions, particular flow regimes or other particular conditions. These methods can therefore not provide reliable measurements of the flow velocity in multi-phase systems over a wide range of conditions.

An alternative metering method for use with multi-phase systems is described in NO Patent No. 174643. This patent describes a method for metering of flow velocity and quantity or mass ratio between different phases in pipes and wells in which the flowing medium comprises several phases, particularly two-phase systems of the natural gas and oil type. A pressure pulse generator arranged in or adjacent to the pipe or the well produces a low frequent pressure pulse (<100 Hz) which propagates both upstream and downstream through the flowing medium. The pressure pulse is recorded by two pressure transductors located respectively upstream and downstream of the pressure pulse generator and located at a known distance from the pressure pulse generator.

Using a time difference basis between the pressure pulse propagation time through the medium from the pressure pulse generator to the respective pressure transductors, the flow velocity of the medium can be calculated. The mass ratio between the different phases can be determined by subtracting the absolute flow velocity of the medium from the measured propagation velocity measured, and then comparing the real propagation velocity with theoretical or empirical data. The low frequent pressure pulse will absorb to a far less extent than pulses having a higher frequency, thus enabling a substantially exact mass measurement of a two-phase flow.

OBJECT

The main object of the present invention is to provide a method for measuring the flow rate in a fluid flow, particularly multi-phase flows in oil wells and connected pipelines, by using a minimum of metering equipment.

THE INVENTION

In accordance with the invention one can obtain values representing mass flow of gas and liquid in a fluid flow by performing a temporary but complete shut-down of the fluid flow by means of a relatively fast closing valve, and recording changes in fluid pressure by means of at least one pressure sensor located immediately upstream of the shut-off valve. As described in further detail below, the recorded pressure signals are transmitted to a processing unit which performs the required calculations.

In this way it is possible to provide values for flow rate at a moment in time, immediately before shutting off the fluid flow, by means of only one pressure sensor and a connected signal processing unit, in other words by means of a minimum of extra equipment. This supposes that the fluid density and specific acoustic sound velocity are known. If the specific acoustic speed and density are not known a simultaneous metering of these parameters can be performed with two extra pressure sensors, one of which (reference sensor) is located immediately downstream of the shut-off valve and the second located at a known distance downstream of the reference sensor.

In measurements of multi-phase flows, the present method is best suited for metering of relatively stable and homogenous flows, such as those found in oil wells in the North Sea, and in systems in which short temporary shut-downs of the fluid flow is permitted.

For ease of description and interpretation of the invention there is set forth an example with a subsea well. The person skilled in the art will however, based on his/her knowledge and the present description easily realize that the metering method can be used with other multi-phase flows without any substantial modifications.

Definition

The term "quick closing valve" means a shut-off valve which closes within a short period of time, e.g., within less than 10 seconds. In metering of a multi-phase flow from an oil production well, the hydraulically actuated wing valve located at the well head can be used. Common wing valves can close within less than 5 seconds. The term quid closing is in this context not meant to encompass the specialized quick closing valves which are in use with multi-phase laboratories which closes within one second or less. This permits the use of existing equipment.

The term "pressure sensor" means in this connection a pressure transducer which allows a relatively large number of pressure measurements of the fluid pressure per unit time during a period of time in the range of some tens of seconds. A pressure sensor performing 100 measurements per second will be satisfactory in most situations. The most important is that the sensor provides a sufficiently large number of measurements per unit of time to reproduce or translate the pressure course with sufficient degree of accuracy.

DESCRIPTION OF THE FIGURES

FIG. 6 is a graphical illustration of the pressure course as a function of time in accordance with the example.

DETAILED DESCRIPTION

The method is based upon the fluid pressure characteristics as a function of time in a period of time immediately before shut-off to a selected moment in time after full or complete shut-off of the fluid flow.

Figure 1:
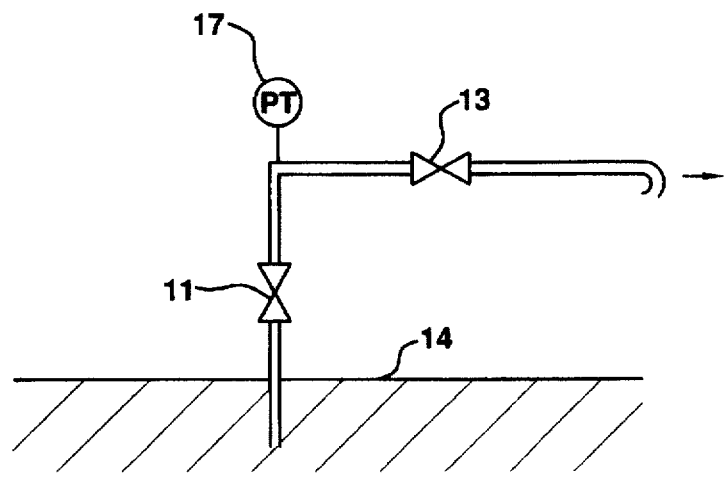
FIG. 1 is a schematic illustration of an arrangement for metering of mass flux in a multi-phase flow from an oil well for which the specific acoustic velocity of the medium including its density are known.

FIG. 1 shows a simplified arrangement for determination of mass flux in a subsea oil well, in which a pressure sensor 17 is located immediately upstream of the well wing valve 13. The wellhead valve arrangement located at the sea bed 14 is illustrated schematically at 11. The valve arrangement 11 is supposed to be open.

In shut-off of oil and gas wells the total pressure increase can be expressed as a sum of the following elements: pressure loss caused by pressure shock (hereinafter denoted as pressure surge), friction loss and hydrostatic pressure loss:

$$\Delta p = \Delta p_a + \Delta p_f + \Delta p_g \qquad (1)$$

When shutting off oil and gas wells in a short period of time (a few seconds), all of the essentials pressure loss elements will become available as static pressure below the shut-off valve. The pressure increase occurs gradually with time and with different mutual characteristics, and the present method utilizes these characteristics in the determination of the flow rate of the multi-phase flow.

When shutting off wing valve 13 a pressure shock or surge is observed below (upstream) the valve, measured by pressure sensor 17 in FIG. 1, and is present until the valve is fully closed. If the valve closes instantaneously, a similar momentary pressure increase at the valve will be observed. This effect is known as the water hammer effect (cf. G. Z. Watters "Analysis and Control of Unsteady Flow in Pipelines", Butterworths, 1984 og J. A. Fox "Transient Flow in Pipes, Open Channels and Sewers", Ellis Horwood Ltd., 1989):

$$\Delta p_a = \rho \cdot a \cdot \Delta u \qquad (2)$$

where ρ—the fluid density, a—the acoustic velocity of the medium, and Δu—change in fluid flow velocity. When the valve is fully closed, Δu corresponds to the flow velocity of the medium immediately before closure of the valve.

Practically simultaneously with the initial closing of the valve there will be a gradual pressure increase below the shut-off valve 13 due to friction loss, measured at pressure sensor 17. This pressure increase is in general linear with time, and also takes place after the valve has been closed provided that the valve exhibits a linear closing characteristic. In real systems, however, one will have to perform correlations with respect to the valve characteristic. The pressure contribution from the friction loss can be expressed as follows:

$$\Delta p_f = \frac{f}{2} \; \frac{L}{d} \; \rho u^2 \qquad (3)$$

where f is the pipe friction factor, L is the pipe length in question, d is the pipe diameter, ρ is the density of the medium and u is the flow velocity of the medium.

Since u in equation 3 and Δu in equation 2 are equal, the density ρ in equation 3 can be substituted for the density of equation 2:

$$u = \frac{a \Delta p_f}{\frac{f}{2} \; \frac{L}{d} \; \Delta p_a} \qquad (4)$$

This equation forms the basis for the determination of the multi-phase flow mass flux immediately before valve shut-off. The friction factor f is known and the pipe diameter d is known, so is the acoustic velocity of the medium, which otherwise can be measured, as described in further detail below, and the pressure surge pressure Δp, is found by measuring the pressure change from the moment the valve starts closing to the moment when the valve is fully closed. The pressure contribution from friction including the pipe length L in question is determined as follows.

When the valve 13 starts closing a pressure pulse will propagate in both directions from the valve, i.e., upstream and downstream. A pressure pulse propagating upstream in an oil well (down into the well) will occur at the fluid sound velocity, i.e., its acoustic velocity. If the acoustic velocity is 200 m/s the pressure pulse propagates 200 meters in a second. The pressure pulse travelling down into the well at an acoustic velocity will stop the flow and make the friction loss available. This occurs gradually during travel of the pulse along the pipe, and at an arbitrary moment of time during travel the valve shut-off the pressure contribution from friction at a pipe length L from the shut-off valve will appear at the shut-off valve (measured by pressure sensor 17) after a time t and effect a pressure increase there:

$$t = \frac{2L}{a} \qquad (5)$$

where a is the acoustic velocity of the composition. By replacing L in equation 4 by ta/2 for L in equation 5, the fluid flow velocity becomes:

$$u = \frac{\Delta p_f^*}{\frac{f t^*}{4d} \Delta p_a} \quad (6)$$

where $\Delta p_1^*$ is the friction loss contribution measured at moment of time t*. The composition flow velocity is found by means of equation 6 above and measuring $\Delta p_f^*$ in a time t' after the valve 13 is closed by means of equation 6. Provided that the composition density is known, the mass flux G of the composition can be found according to the following equation:

$$G = \rho \cdot u \quad (7)$$

Figure 2:
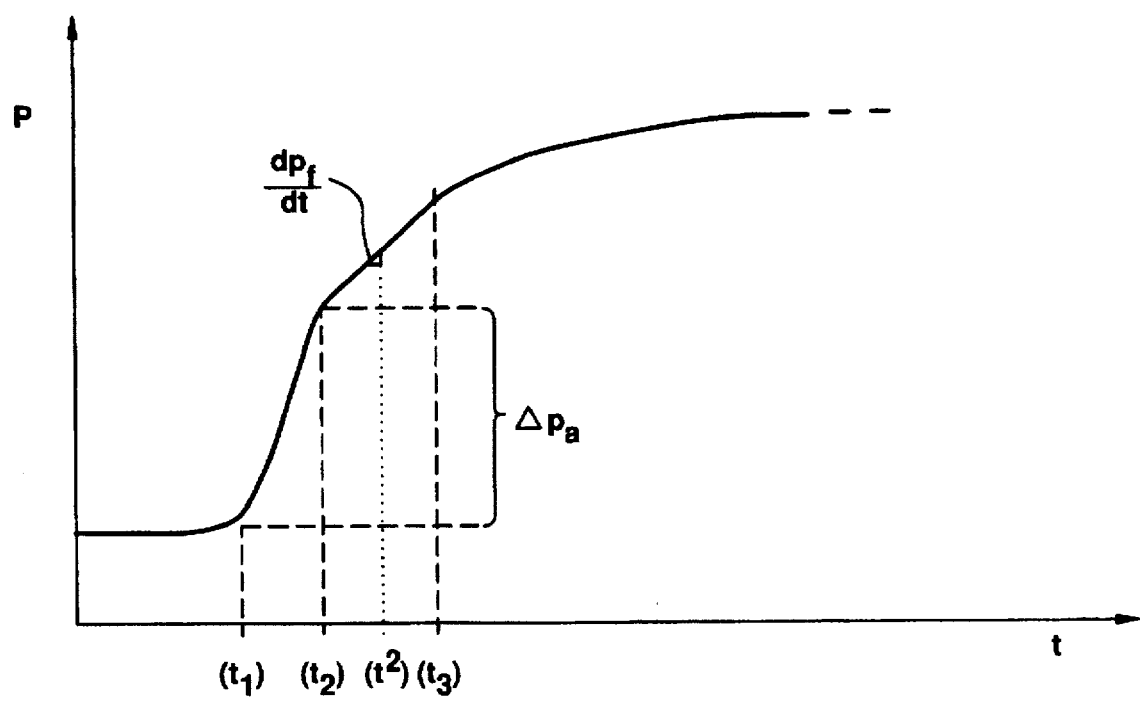
FIG. 2 is a diagram illustrating the general pressure course during shut-off of a valve.

FIG. 2 illustrates the basic principle of the performance or behaviour of the pressure change occuring at shut-off of an oil well in which the pressure course p is shown as a function of time t, measured by, for example, pressure sensor 17 in FIG. 1. As is evident from FIG. 2, the valve starts closing at time $t_1$, and the pressure increases substantially linearly with a first slope or derivative to the moment of time $t_2$, at which the valve has become fully closed. The pressure difference between times $t_2$ and $t_1$ represents the pressure surge pressure $\Delta p_a$ plus the friction loss contribution during the same period of time. After time $t_2$ the pressure increase is represented by the contribution from the friction loss $\Delta p_f$ alone, which measured at moment of time t* has a slope or derivative $dp_f/dt$ which is different from the derivative $dp_a/dt$ within the period of time from $t_1$ to $t_2$. At the moment of time $t_3$ substantially all friction loss ($\Delta p_f$) has been converted to static pressure. However, in oil wells there will be a gradual pressure increase over time caused by hydrostatic contribution from the formation.

As mentioned above, $\Delta p_a$ is found by measuring the pressure increase which occurs during the period of time the valve is being closed, or analyzing the pressure change derivative afterwards and substituting the initial fluid pressure from the absolute pressure when the pressure change derivative changes, i.e., when the contribution from the friction loss starts taking over. As mentioned above the pressure will also increase as a result of already released friction loss from time $t_1$, and $\Delta p_a$ will have to be correlated in view of this contribution. This contribution is usually substantially less than released friction loss after time $t_2$. A moment of time t* is then selected after the valve is closed, and the contribution from the friction pressure loss $dp_f/dt$ is determined. This value for change of pressure at time t* is inserted into equation 6 above together with f, t*, d and $\Delta p_a$, after $\Delta p_a$ has been corrected with respect to the friction loss contribution: $\Delta p_a = \Delta p_a(\text{measured}) - \Delta p_1(t_2-t_1)$, where $\Delta p_a$ is the measured pressure increase from the friction loss calculated for the period of time $t_1$ to $t_2$. The contribution from the friction loss is in comparison low, and the measured $\Delta p_a$ is often sufficient to determine the mass flux of the composition.

Unknown Acoustic Velocity and Density

Figure 3:
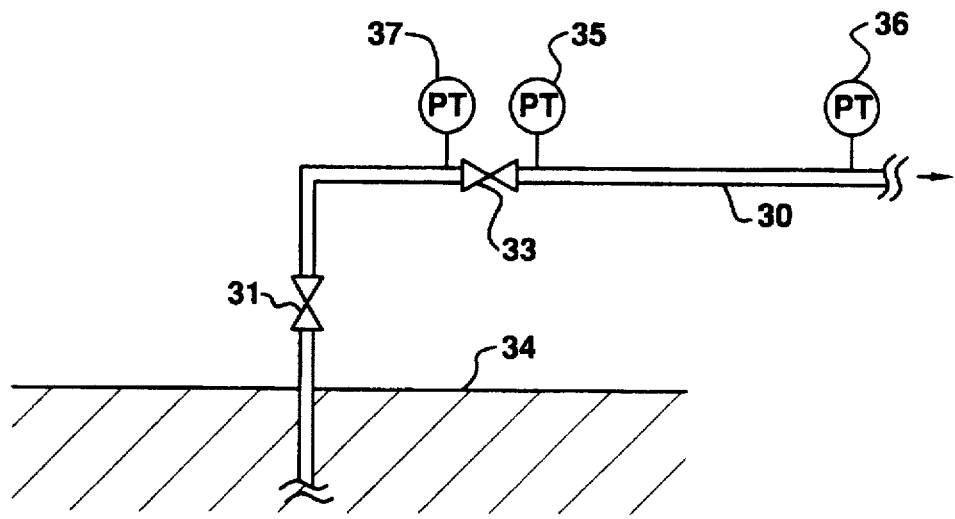
FIG. 3 shows an alternative embodiment of the arrangement of FIG. 1 to additionally determine the specific acoustic velocity of the medium.

As mentioned above, density and acoustic velocity for unstable or unknown multi-phase compositions will have to be determined from simultaneous measurements. As illustrated in FIG. 3, this can be done by using two extra pressure sensors 35 and 36, one of which is located immediately downstream of the shut-off valve 33 while the second sensor 36 is located at a known distance downstream of the reference sensor 35, e.g. at a distance of 20 meters. By measuring the propagation time t for a characteristic pressure pulse from the reference sensor 35 to the sensor 36 downstream over a distance L, the acoustic sound velocity a of the composition is found:

$$a' = (a + u) = \frac{L}{t} \quad (8)$$

The measured a' is the sum of the fluid specific acoustic velocity a and the fluid flow velocity u. In typical multiphase flows from for example an oil well, the flow velocity of the composition will lie in the range 1–10 m/s whereas the specific acoustic velocity is about 200 m/s. Having a flow velocity of 10 m/s, the flow velocity u can be found by inserting a' instead of a in equation 6 with a maximum error factor of 5%. The friction factor f is also a function of the compositions flow velocity u, but since the friction factor f changes insignificantly with changes in the flow velocity u of the composition, and since u is far less than a, the friction can be assumed to be constant, and the calculated flow velocity us in accordance with equation 6 will then be very close to the real value. The accuracy of the calculated u can be improved by, e.g., performing repeated iteration with equation 6 and 8, or correlate according to acoustic models in view of the physical properties of the composition.

When the specific acoustic velocity a and the flow velocity u of the composition have been determined in accordance with equation 6, the composition density can be determined from equation 2 above, and hence the composition mass flux.

The distance L between the reference sensor and the metering sensor is in general selected with respect to the specific acoustic characteristics of the composition and the accuracy of the metering equipment, i.e., how many registrations the equipment can perform per unit of time. The lower the sample frequency the longer the distance L will have to be. On the other hand, the higher the sample frequency, the shorter distance L will need to be. A typical distance L for measuring oil wells will be within the range of 20 to 50 meters.

Pure Gaseous Compositions

To measure gas flow in wells and pipelines, the only requirement is to measure the pressure surge pressure $\Delta p_a$. As gas densities and acoustic velocities in general are easy to determine in view of pressure, temperature and chemical composition, and provided, naturally, that also these parameters are known, the mass flux can be determined in accordance with equation 2 and 7 above.

Alternative Embodiments

Figure 4:
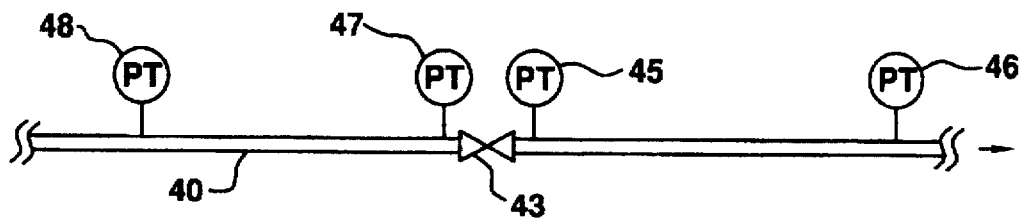
FIG. 4 shows schematically an alternative use of the present method in connection with NO Patent No. 174643.

In pipelines permitting installation of several pressure sensors and where the composition characteristics are less predictable, it may be advantageous to use two reference pressure sensors 47 and 45 (FIG. 4) located upstream and downstream respectively of the shut-off valve 43 and providing two metering sensors 48 and 46 located at known distances upstream and downstream, respectively, of the respective reference sensors 47 and 45. The mode of operation for this embodiment is similar to the one described above, except that the acoustic velocity a of the composition can be found directly by measuring the difference in the pressure pulse propagation speed from the shut-off valve 43 measured at 45 and 47 to the respective metering sensors 46 and 48.

$$a = \frac{1}{2}(u_N - u_0) \quad (9)$$

where $u_N$ is the pressure pulse propagation velocity downstream and $u_o$ is the pressure pulse propagation speed upstream. The flow velocity u of the composition is found from the equation $u = 0.5 \cdot (u_N - u_o)$ or by substracting the specific acoustic velocity a of the composition from the measured pulse propagation velocity: $u = u_N - a$, and the density of the composition can be calculated directly from equation 2 above. The shut-off valve 43 will in this case replace the pressure pulse generator described in NO Patent 174643.

Figure 5:
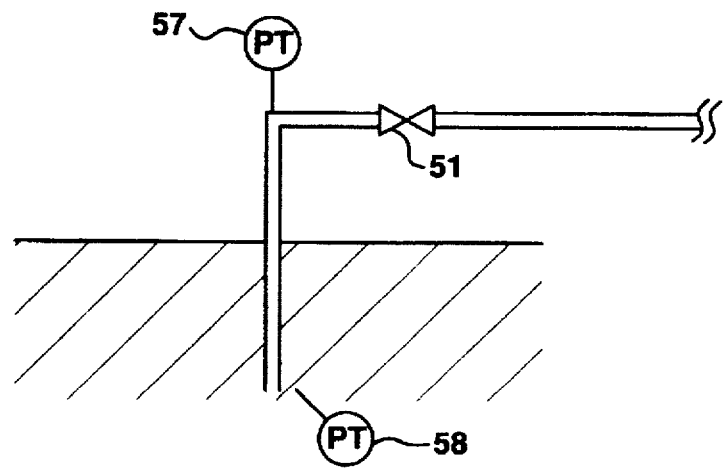
FIG. 5 shows an alternative arrangement to practise the present method.

In a further alternative embodiment, as illustrated in FIG. 5, two pressure sensors 57 and 58 can be used. Both sensors are located upstream of the well wing valve 51 at the wellhead. The sensor 57 serves as a reference sensor and is located immediately upstream of the valve 51, whereas the sensor 58 is located at a known distance (a) from the reference sensor 57. This arrangement will in general operate in a manner similar to the embodiment illustrated in FIG. 3, but with the difference that the reference sensor 57 serves both as reference for determination of the specific acoustic velocity of the composition and the pressure course at the shut-off valve.

It should be noted that the description above is in respect of an ideal homogenous flow regime, and with the shut-off valve exhibiting a linear characteristic. However, control valves will not start throttling the flow until the end of the closing cycle is reached, and the contribution from the pressure loss will, in the closing phase of the valve, vary for instance with the valve characteristics. The method must in practical circumstances be corrected for such factores.

EXAMPLE

Practical metering experiments were performed on a well in the North Sea to verify the validity of the method. The experiments were performed in connection with a pressure build-up test. After withdrawal of the string, a quartz crystal gauge from Hewlett Packard was mounted in the grease nipple at the well head at a location between the well head valve and the wing valve, in accordance with the schematical illustration in FIG. 1.

Reference data was provided with the simulating program PROSPER, which was fed with real pressure and temperature data from the separation step.

A consecutive registration of the well pressure was performed with the pressure sensor for a period of about 3 minutes from zero production flow, during wing valve shut-off, and to a moment of time where stable well pressure was obtained. The pressure course during the experiment is illustrated in FIG. 6. As is evident from FIG. 6, the pressure increased by about 3.0 bars during 3.6 seconds—the time required to close the valve—this pressure representing the pressure surge $\Delta p_a$. This complete closure of the valve appears from the break in the pressure curve at time B in FIG. 6, whereupon the pressure increase was caused by contribution from friction loss $\Delta p_f$ alone. The pressure loss contribution $\Delta p_f$ to the measured pressure surge $\Delta p_a$ is omitted for simplicity. FIG. 6 further shows that the pressure increased substantially linearly from time B to time C, at which substantially all friction loss had been made available as static pressure at the wing valve, i.e., within about 25 seconds. The remaining pressure increase after time C is caused by hydrostatic pressure from the formation. The PROSPER simulation with, among other parameters, a well head pressure of 102.8 bars shows a mean density in the area below the wellhead of about 500 kg/m³, and from equation 2 above, the flow velocity of the composition was found to be 3.0 m/s.

The PROSPER simulation showed a flow velocity of 3.7 m/s, which can be said to be in good conformity with the flow velocity measured by the present method.

I claim:

1. Method for measuring the flow rate in a fluid flow (30), particularly a two-phase flow comprising oil, water and gas from a development well offshore, characterized in: performing a temporary transistory shut-off of the fluid flow by means of a valve (33), and recording the fluid pressure at a location (37) immediately upstream of the valve (33) from a moment of time when the valve starts closing to a selected moment of time after the valve is fully closed, and opening the valve to re-establish the fluid flow, and determining the fluid mass flux G according to the ratio $$G = \frac{\rho \Delta p^*_f}{\frac{f t^*}{4d} \Delta p_a}$$

where $\rho$=fluid density, f=friction factor, d=pipe diameter, t*=a selected moment of time after closure of the valve, $\Delta p_f^*$ is friction loss recorded at time t* and $\Delta p_a$ is pressure surge pressure represented by recorded pressure increase at the moment the valve is fully closed.

2. The method of claim 1, characterized in determining the velocity of acoustic pulse propagation in the fluid by measuring pressure as a function of time during shut-off of the valve by a reference metering means (35) and a metering means (36) located at a known distance downstream of the reference metering means (35), and determining said acoustic pulse propagation velocity according to the equation $$a = L/t.$$

3. The method of claim 1, characterized in determining the flow rate and acoustic pulse propagation velocity in a flowing multi-phase medium from a development well by a reference metering means (57) located immediately upstream of the shut-off valve (51) and a metering means (58) located at a known distance upstream of the reference metering means (57).

4. Method for measuring the flow rate of a fluid flow (40) comprising at least two phases, by means of pressure sensors (45, 46) downstream and pressure sensors (47, 48) upstream of a pulse generating means (43), characterized in using a quick-closing valve as said pulse generating means (43), and changing the valve (43) position from substantially open to fully closed, recording the fluid pressure by the pressure sensors (47, 48) and (45, 46) from a time when the valve starts closing to a selected moments time after the valve is fully closed, and then opening the valve to re-establish the fluid flow, determining the fluid flow velocity and specific acoustic velocity according to the ratio $$a = \frac{1}{2}(u_N + u_o) \quad (9)$$

where $u_N$ is the pressure pulse propagation velocity downstream and $u_o$ is the pressure pulse propagation velocity upstream, and providing the fluid flow velocity u from the formula $u=0.5 \cdot (u_N-u_o)$ or by substracting the fluid specific acoustic velocity a from the measured pulse propagation velocity: $u=u_N-a$, and determining the fluid density $\rho$ according to the ratio $$\Delta p_a = \rho \cdot a \cdot \Delta u \quad (2)$$

where $\Delta u$ is the change of fluid velocity, a is the velocity of acoustic pulse propagation in the fluid, thus determining the fluid flow rate G according to the equation $$G = \rho \cdot u \quad (7)$$

where u is the fluid flow rate immediately before the valve starts closing.

* * * * *